United States Patent

[11] 3,596,114

[72] Inventors Joseph T. Maupin;
Everett A. Vorthmann, both of Freeport, Ill.

[21] Appl. No. 879,684
[22] Filed Nov. 25, 1969
[45] Patented July 27, 1971
[73] Assignee Honeywell, Inc.
Minneapolis, Minn.

[54] HALL EFFECT CONTACTLESS SWITCH WITH PREBIASED SCHMITT TRIGGER
4 Claims, 6 Drawing Figs.

[52] U.S. Cl. .................... 307/278, 307/290, 307/303, 307/309, 307/315, 317/235 E, 317/235 H, 317/235 R
[51] Int. Cl. .................... H01v 5/00, H01l 19/00
[50] Field of Search .................... 307/278, 309, 290; 317/235(23); 324/45; 179/100.2 CH; 329/200; 330/6

[56] References Cited
UNITED STATES PATENTS

| | | | |
|---|---|---|---|
| 2,774,890 | 12/1956 | Semmelman | 307/149 |
| 2,988,650 | 6/1961 | Weiss | 317/235 (23) |
| 3,021,459 | 2/1962 | Grubbs et al. | 317/235 (23) |
| 3,297,009 | 1/1967 | Sasaki et al. | 307/309 X |
| 3,305,790 | 2/1967 | Parsons et al. | 307/309 X |
| 3,471,718 | 10/1969 | Weisz | 307/290 |
| 3,522,494 | 8/1970 | Bosch | 317/235 |

*Primary Examiner*—John W. Huckert
*Assistant Examiner*—W. D. Larkins
*Attorneys*—Lamont B. Koontz and Robert O. Vidas

ABSTRACT: A contactless switch in monolithic semiconductor body wherein a Hall effect element having offset Hall Contacts is integrated with a bistable circuit element of the Schmitt trigger-type, thus providing prebias for the Schmitt trigger. In the preferred form, an amplifier circuit is also included in the same body.

INVENTOR.
JOSEPH T. MAUPIN
EVERETT A. VORTHMANN

BY Robert O. Vidas

ATTORNEY.

HALL EFFECT CONTACTLESS SWITCH WITH PREBIASED SCHMITT TRIGGER

BACKGROUND OF THE INVENTION

The present invention is primarily directed to a switch which, while useful for a wide variety of purposes, has been specifically designed for use in keyboards. Previous keyboards using electrical switches have principally relied upon a transfer of mechanical motion to physically close a pair of electrical contacts to complete a circuit. One commonly used keyboard switch arrangement utilizes a reed switch wherein the motion of the keyboard member positions a magnet alongside of a reed switch so as to close the contacts. Such an arrangement has proved to be acceptable although several inherent difficulties lie in such an arrangement that are overcome through the use of a completely solid-state device. One of the drawbacks of this prior art arrangement is the production of bounce when the contact is made or opened. Such bounce is, or course, undesirable in most applications. A second problem that exists is the tendency for such an arrangement to have relatively limited life when compared to the invention of the present application.

In the past other investigators have made use of solid-state elements incorporating the Hall effect. However, such prior art usages of the Hall effect to provide a signal as a result of mechanical motion of a magnet member have not been in a form which is compatible with the most commonly used integrated circuit technology, nor have they provided a combination of a bistable device with memory characteristics in integrated combination with a Hall effect element. In order to make a semiconductor contactless switch, one must face up to several problems. The first of these problems is that the Hall effect produces a very low voltage output even in the semiconductor materials having a relatively large Hall coefficient. This is an even more severe problem when one deals with silicon as the semiconductor material chosen to make the Hall element. However, in order to take advantage of the integrated circuit capabilities, one is restricted, in practice, to the use of silicon. Other materials may be used. A second problem is that in utilization of a Hall element in a miniature device one is restricted to the relatively low magnetic fields available from small magnets of the permanent type. Still another factor is that of keeping the cost of such elements at a low enough price to be competitive with other nonsolid-state solutions to the same need.

SUMMARY OF THE INVENTION

The present invention has overcome the above problems of utilizing the Hall effect in a contactless switch arrangement. This has been done while simultaneously providing an element that can be manufactured in completely compatible arrangement with and make avail of the integrated circuit technology. Broadly, the entire solid-state portion of the present invention consists of a wafer or die of semiconductor material of P-type having the active semiconductor elements provided in an epitaxial layer of N-type silicon. The utilization of a very thin layer of epitaxial N-type silicon provides several advantages. First, it is a commonly utilized technique in the manufacture of integrated circuits and therefore all of the other circuit components besides the Hall element are readily formed using standard techniques. Second, while silicon generally is not the preferred material to be used for Hall output, because of its relatively low mobility, it does possess a relatively constant mobility figure when impurity concentrations are in the vicinity of $10^{16}$ atoms per cc. of N-type impurity. N-type is also preferred as the mobility is always higher than P-type. Epitaxial material with such an impurity level is a good starting point for the formation of other integrated circuit components.

The equation most commonly used to describe the Hall voltage output is that given below.

1. $V_H = (R_H\, I\, B / 10^8\, t)$ where
$V_H$ = Hall voltage $R_H$ = Hall coefficient
$I$ = Current
$B$ = Magnetic field
$t$ = thickness of the Hall element.

From this equation it would appear most desirable that the Hall element be as thin as possible to enhance the Hall voltage. However, it is highly desirable (for reasons of use) that a constant voltage source be utilized rather than having a constant current. As a practical matter, constant voltage is more readily available than constant current. It can easily be shown that the following equation is applicable to the case of a constant voltage source.

2. $V_H = V_{S} \mu_d B \frac{W}{L} 10^{-8}$ where
$V_S$ = Voltage of source
$\mu d$ = Mobility
$W$ = Width
$L$ = Length.

Thus, it is seen that the thickness is not the critical factor in this instance and that, within limits, by close control of width and length one can obtain the desired Hall voltage controllability. As it has already been indicated, the mobility of the carriers is a prime factor and within the limitations described above silicon is a satisfactory material for this purpose.

As the Hall output is a relatively small voltage which changes in linear fashion dependent on this incident flux, it was determined that the voltage itself should be utilized to operate an on-off bistable circuit element. As will be described further hereinbelow, a Schmitt trigger type element has been found to be most appropriate for this purpose. However, in order to obtain the greatest possible efficiency in the device it is most important that certain design considerations be followed in constructing the device in accordance with the invention. These criteria will be discussed in greater detail below.

DESCRIPTION OF THE PREFERRED EMBODIMENTS

Figure 1:
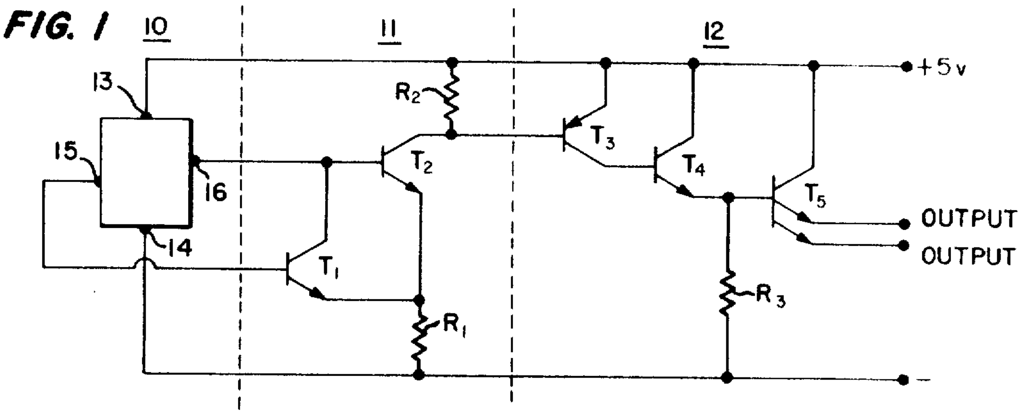
FIG. 1 is a circuit equivalent of a semiconductor portion of a contactless switch in accordance with the present invention.
Figure 3:
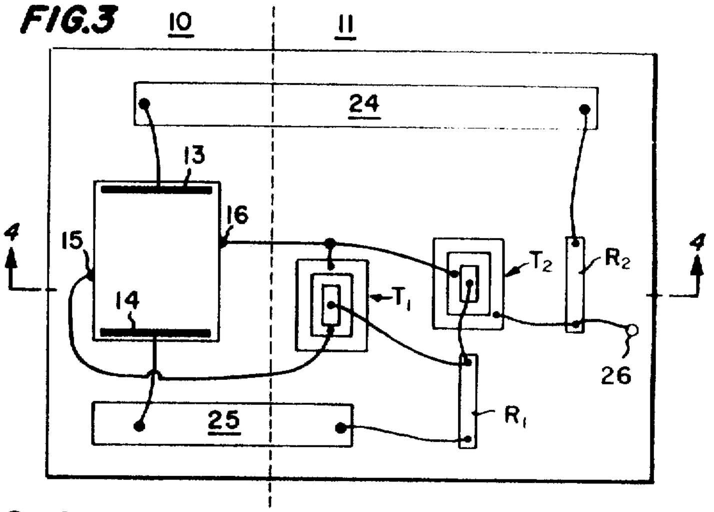
FIG. 3 is a face view in schematic form of an integrated circuit chip in accordance with the invention.
Figure 4:
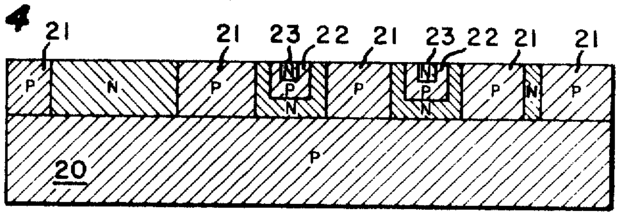
FIG. 4 is a section of the device of FIG. 3.

For reasons that will become apparent in the discussion which follows the device of the present invention may be represented by a circuit as illustrated in FIG. 1. Portion 10 of the circuit comprises a Hall element, portion 11 of the circuit comprises a bistable circuit which is shown as being of the Schmitt trigger type and portion 12 of the circuit is an amplifier of the Darlington type. This entire circuit may be integrated into a single body of semiconductor material through the use of an epitaxial N-type layer of semiconductor material on a P-type substrate. Such a showing is illustrated in FIGS. 3 and 4 of the drawings wherein FIG. 3 is a schematic layout of the portions 10 and 11 of the FIG. 1 and FIG. 4 is a section along line 4—4 of FIG. 3.

As constant voltage is far more conveniently available than constant current, the device of the present invention utilizes a constant voltage source for its intended operation. As has been illustrated above with the equation 2, the Hall voltage is mobility dependent in the constant voltage mode but is not as directly concerned with the thickness of the Hall element as would appear from equation 1. The importance of this is that the Hall element through appropriate tailoring of the epitaxial layer impurity concentration can occupy the entire thickness.

This permits with a high degree of precision a close control of all of the variables giving rise to a Hall voltage. It will be obvious to those skilled in the art that it is most important that the Hall output in an actual device be one that is closely predictable when one intends to manufacture large numbers of integrated circuit devices. In order to have reproducibility of the Hall voltage, it is necessary that the dimensional characteristics of the Hall element be closely controlled as well as the impurity concentrations. If one uses the entire thickness of the epitaxial layer, one can achieve all of these goals. The impurity concentration will be unaltered by diffusion considerations as the epitaxial material is not changed after its deposition. Likewise, the dimensional outlines of the Hall element may be closely controlled as only a single isolation diffusion is involved in the geometry considerations. The positioning of electrodes both for the input and output of the Hall element are likewise closely controllable by a single diffusion step of high-conductivity N-type impurities as will be explained in greater detail. This is particularly important as an offset voltage is utilized to prebias the Schmitt trigger portion of the assembly to a position near to the on-off portion of the circuit curve. The Schmitt trigger in order to have a negative resistance region requires close control of a resistance ratio between the collector resistance and the common emitter connection resistance. If this ratio of resistance is maintained in a certain ratio, then a snap-acting or regenerative mode of operation is achieved wherein small voltage output on the part of the Hall element will positively turn on and turn off a Schmitt trigger and the output of the entire assembly in a predictable manner. As those familiar with the integrated circuit art are well aware, the production of resistors having absolute values is extremely difficult to achieve in integrated circuit devices without the use of external resistors. Such external resistors are undesirable both from a point of view of cost as well as for purposes of compactness. However, by the close geometry control made available through adaptations of the inventors of the epitaxial layer for their device the ratio of the resistances of the common emitter and collector portions of the Schmitt trigger can be kept within the necessary limitations such that a highly predictable operation of the Schmitt trigger is achieved. The value of such a close control is best illustrated by consideration of FIG. 2.

Figure 2:
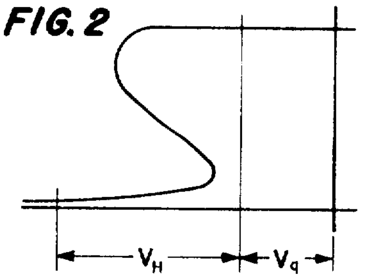
FIG. 2 is a plot of the current—voltage control characteristic of the trigger circuit (viewed at the base of $T_1$) of a device in accordance with the invention.

In FIG. 2 there is illustrated a plot of the current versus voltage control characteristic of a Schmitt trigger in accordance with the invention. As can be seen, there is a negative resistance region. This region occurs when control of the circuit characteristics are maintained in accordance with the present invention. It has been found that the regenerative mode of operation actually takes place over a voltage change region of about 8 millivolts, corresponding to the negative resistance region of the control characteristic. In order to make best use of the Hall output which in the present invention is in the vicinity of 30 to 40 millivolts at an input voltage of 5 volts—it is desirable to have a prebias on the Schmitt trigger. This is indicated in FIG. 2 as $V_e$. The $V_e$ is obtained by offsetting the Hall probe electrodes by a closely controlled predetermined amount to provide the prebias necessary to insure that a positive on to off occurs when the motion of a magnetic member produces a change in the Hall voltage. Consistent with circuit theory, the trigger points of the device correspond to the inflection points in FIG. 2.

Turning to FIG. 1, there is shown in schematic form a circuit including the previously designated regions 10, 11 and 12. Region 10, which includes the Hall element itself, comprises a rectangular shaped Hall element with lead input electrodes 13 and 14. The output of the Hall element is provided by electrodes 15 and 16. As can be seen from the drawing, electrode 16 is nearer along the axis of the input electrodes to the Hall element to electrode 13 than is Hall output electrode 15. This offset provides the voltage dividing difference between electrodes 15 and 16 which becomes $V_e$.

In portion 11 of FIG. 1 there is indicated two transistors, $T_1$ and $T_2$ having a common emitter connection going to ground through resistor $R_1$. The base of transistor $T_1$ is connected to Hall output electrode 15 while the base of $T_2$ and collector of $T_1$ are connected to Hall output electrode 16. The collector of transistor $T_2$ goes through resistor $R_2$ to the positive voltage source and also goes to a PNP transistor and to the Darlington circuit portion generally indicated as 12. The collector resistance for $T_1$ comprises the resistance between contact 16 through leads 13 and 14 to the voltage source. The emitter resistance of the transistors is determined by resistor $R_1$.

Circuit analysis shows that the ratio of the effective value of the resistance in the collector load of $T_1$, through Hall element 10, to $R_1$ should be about 0.075, for a supply voltage of 5 volts. For an actual case the value for the collector resistance was 450 ohms and $R_1$ was 6000 ohms. As noted, the absolute values are of lesser importance and the ratio is what needs to be controlled.

In region 12 there is provided a PNP transistor $T_3$ and two NPN transistors in cascaded form $T_4$ and $T_5$. Transistor $T_5$ is provided with a plurality of outputs from the emitter.

Referring to FIG. 3, there is shown in diagrammatic form a surface view of the layout of portions 10 and 11 of FIG. 1. In FIG. 4 there is a sectional view of the device diagrammatically illustrated in FIG. 3 through section 4—4. In a construction of the device in accordance with the invention there is provided a base P-type body of silicon generally indicated as 20. The precise characteristics of this material are not critical and a material having from 3 to 15 ohm-cm. resistivity is satisfactory. Over one surface of this P-type substrate there is epitaxially deposited an N-type silicon material. This epitaxial layer of N-type silicon is preferably about 0.3 mils in thickness and has an impurity concentration of about $2\times10^{16}$ atoms per cc. of phosphorous. This corresponds to approximately 0.3 to 0.7 ohm-cm. material. By use of conventional photolithographic techniques and oxide masking, portions of the epitaxial layer are diffused with a P-type impurity to produce a series of electrically isolated regions of the original N-type epitaxial material with intervening P-type diffused material extending completely through the epitaxial layer. Such P-type isolation material is generally indicated in FIG. 4 as 21.

The isolated regions of the N-type epitaxial material are then utilized to form the various elements shown in FIGS. 1 and 3. The Hall element generally indicated 10 is formed by diffusing into the appropriate surface portion thereof electrodes to form the voltage input leads 13 and 14 as well as the offset Hall voltage probes 15 and 16. All of these electrodes can be readily formed by the diffusion of N-type material (in the conventional manner) to form an N+ region. In the case of the transistor members $T_1$ and $T_2$ the isolated regions of N-type epitaxial material have diffused into the exposed surface thereof in the known way quantities of a P-type dopant such as boron to produce P-type regions within the N-type epitaxial material. These P-type regions are indicated as 22 as the two transistors should have closely matched $V_{BE}$ and should have a gain of greater than 50. The two transistors will be closely matched in geometry. Into the P-type region 22 an additional diffusion of N-type impurity at high concentration level is made to form the emitter portions of the transistor indicated as 23. This latter diffusion of N-type impurities can be done simultaneously with the diffusion of the N-type materials to form contacts 13, 14, 15 and 16 as well as contacts to resistor regions $R_1$ and $R_2$.

The resistors $R_1$ and $R_2$ are merely regions of N-type epitaxial material that have been formed through the diffusion of P-type impurities into the body to provide such regions. By the use of evaporated leads of aluminum or similar metal, one provides the interconnections necessary to form the circuit of FIG. 1. In the drawings these have been shown as single lines connecting points of contact. Shown in FIG. 3, are bar members 24 and 25 which represent the electrical contact pads for the chip to the external electrical world as well as to the elements of the chip. They would consist typically of relatively large area evaporated aluminum pads. The external connections to these pads would be to the voltage source, while from the pad would extend the leads across the surface of the semiconductor body to make appropriate connections within the chip itself. As the portion shown in FIGS. 3 and 4 does not include the Darlington amplifier portion of FIG. 1, the output of the device has been indicated merely as an output contact 26.

Figure 5:
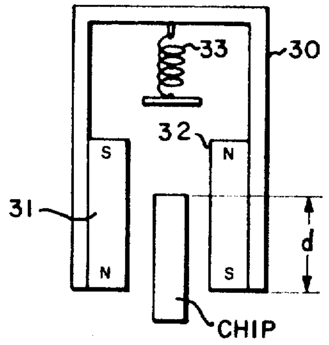
FIG. 5 is a schematic illustration of the magnet activation of the semiconductor portion of the present invention.
Figure 6:
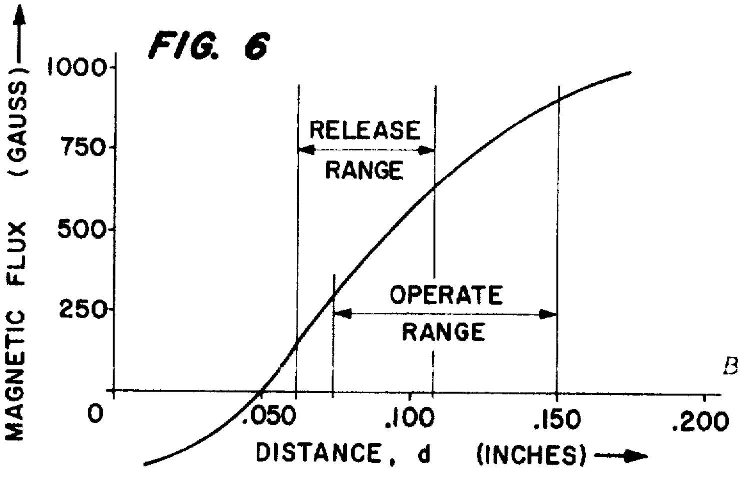
FIG. 6 is a plot of magnetic field intensity versus distance of movement of a magnet in the operation of the contactless switch.

In FIG. 5 there is illustrated in schematic form a magnet arrangement for activating and deactivating a solid-state switch in accordance with the invention. As is shown in the drawing, a semiconductor chip manufactured in accordance with the description given above is positioned between two magnets with a horseshoe shaped bar of some ferromagnetic material generally indicated 30. The magnet members 31 and 32, which may be barium ferrite, are arranged to have their north and south pole in opposition to one another. A spring generally indicated 33 is provided to reposition the magnet assembly in relation to the chip upon release of an external mechanical force. It has been found desirable that the operation of the device be in such a way that in one position of the movement of frame member 30 the magnetic field be impressed through the chip across the Hall element to produce a voltage output in the normal Hall effect way. The travel of the magnets are so arranged that the null point of the individual magnets 31 and 32 is reached upon the travel indicated generally as *d* in the figure. This provides an operational curve, as illustrated in FIG. 6, which shows the distance of travel for a 1,000 Gauss magnet system operating over the motion range of the assembly. Chip size is approximately 50 mil square and magnet travel is as shown. As can be seen, the total travel of the magnet member is quite small and the flux change goes from approximately 300 Gauss up to about 800 Gauss during operation of an actual device. This provides the necessary Hall voltage to operate the latching mode circuit as illustrated in FIG. 2.

The offset voltage $V_q$ provided between electrodes 15 and 16 of the Hall element is of such a value as to insure that transistor $T_1$ is normally in the on condition and that that the output is, thus normally off. When a magnet is brought into conjunction with the Hall element, as illustrated in FIG. 5, so that the field is into the paper in FIG. 1, the Hall voltage output adds to $V_q$ to make point 16 more positive and simultaneously make point 15 more negative, which in turn regeneratively turns off the transistor $T_1$ and turns on transistor $T_2$ thereby turning on the output. Such a circuit operation makes for a very positive turn on and turn off while still maintaining the advantages of relatively low required magnetic field, compactness, and the other advantages made possible through the invention.

The embodiments of the invention in which an exclusive property or right is claimed are defined as follows:

1. A monolithic integrated circuit contactless switch element comprising:

a. a body of silicon semiconductor material of P-type conductivity having a generally N-type surface region of epitaxial silicon of about 0.3 mil thickness, said N-type surface region having an impurity concentration of less than about $2\times10^{16}$ atoms per cc., said epitaxial silicon having extending therethrough P-type regions in a pattern to provide a multiple number of N-type zones electrically isolated from one another by at least two PN junctions, b. a first of said N-type zones defining a all element with first and second ohmic electrodes spaced at remote points thereof and arranged to pass an electric current along a first axis of said Hall element, c. first and second Hall probe electrodes asymmetrically located along the second axis of said Hall element, said first Hall probe being located nearer said first ohmic electrode, d. second and third of said N-type zones including therein respectively first and second NPN transistors of closely matching $V_{BE}$.

e. a fourth of said N-type zones having a generally elongated configuration defining a first resistor with remotely located electrodes thereon, f. a fifth of said N-type zones having a generally elongated configuration defining a second resistor with remotely located electrodes thereon, g. lead means adapted to supply positive voltages to said first ohmic electrode and to a first electrode of said second resistor and a negative voltage to the second of said ohmic electrodes and to a first electrode of said first resistor, h. the first Hall probe electrically connected to the base of said second transistor and to the collector of said first transistor, i. the second Hall probe electrically connected to the base of said first transistor, j. the emitters of said transistors being electrically connected to a second electrode of said first resistor, k. the collector of said second transistor being electrically connected to a second electrode of said second resistor, and also connected to an output electrode, l. the ratio of said first resistor to the resistance of the collector of said first transistor through said Hall element to the voltage source being of a value to provide a latching mode operation of said switch upon activation and deactivation by a magnetic source.

2. The element in accordance with claim 1 wherein the ratio of the resistance of the first resistor to the collector resistance of said first transistor is about 1/0.075, for a supply voltage of 5 volts.

3. The element in accordance with claim 1 wherein the offset of said first and second Hall probes provides a voltage across said probes of about 50 mv at a source voltage of 5 volts.

4. The element of claim 1 wherein an amplifier is provided on the same monolithic body for the output.